United States Patent
Higashijima

[19]

[11] Patent Number: 5,886,502
[45] Date of Patent: Mar. 23, 1999

[54] CELL BALANCE CIRCUIT HAVING RECHARGEABLE CELLS

[75] Inventor: Yasuhisa Higashijima, Hadano, Japan

[73] Assignee: Mitsumi Electric Co., Ltd., Tokyo, Japan

[21] Appl. No.: 902,180

[22] Filed: Jul. 29, 1997

[30] Foreign Application Priority Data

Jul. 30, 1996 [JP] Japan .................... 8-200260

[51] Int. Cl.[6] .................................... H02J 7/00
[52] U.S. Cl. ................... 320/118; 320/116; 320/136
[58] Field of Search ....................... 320/118, 116, 320/121, 122, 119, 125, 134, 135, 136

[56] References Cited

U.S. PATENT DOCUMENTS

| | | | |
|---|---|---|---|
| 5,547,775 | 8/1996 | Eguchi et al. | 320/118 |
| 5,646,503 | 7/1997 | Stockstad | 320/135 |

*Primary Examiner*—Peter S. Wong
*Assistant Examiner*—K. Shin
*Attorney, Agent, or Firm*—Frishauf, Holtz, Goodman, Langer & Chick

[57] ABSTRACT

In a cell balance circuit including a cell group in which two or more rechargeable cells are connected in series, a voltage converting circuit converts the voltages of the respective cells in the cell group into GND voltage standards on the basis of a ground voltage and produces two or more converted voltages. An output circuit determines a lowest voltage of the two or more converted voltages and produces the lowest voltage. Discharge circuits are provided for the respective cells for forming discharge loops to discharge the corresponding cells. Discharge control circuits are provided for the respective discharge circuits. Each discharge control circuit determines a difference between the converted voltage of the corresponding cell and the lowest voltage to control the discharge circuit to form the discharge loop when the difference exceeds a predetermined value.

7 Claims, 2 Drawing Sheets

CELL BALANCE CIRCUIT HAVING RECHARGEABLE CELLS

BACKGROUND OF THE INVENTION:

The present invention relates to a cell balance circuit that achieves a balance of voltages among rechargeable cells to avoid a large difference in voltage among the cells when they are connected in series. The cell balance circuit is particularly suitable for a lithium ion cell.

Lithium ion cells are often used as a cell pack in which two or more cells are connected in series. Such lithium ion cells may have a different voltage. There arises a difference in voltage from cell to cell when two or more cells having different voltages are connected in series. Taking this into consideration, a protective circuit is typically included in the cell pack. The protective circuit inhibits charging of the cell when the voltage of that cell exceeds a first predetermined voltage (which is referred to as an over-charge protecting voltage). The protective circuit also inhibits discharging of the cell when the voltage of that cell drops below a second predetermined voltage (which is referred to as an over-discharge protecting voltage).

With such a protective circuit, the charge is inhibited at a voltage value of the cell having the highest voltage. This means that the cell having a lower voltage is not charged enough. In other words, not all the cells can be charged to have a predetermined amount of electrical energy.

On the other hand, discharging is inhibited at a voltage value of the cell having the lowest voltage. This means that the cell having a higher voltage is not discharged enough. In other words, not all the cells can discharge a predetermined amount of electrical energy. Therefore, both the amounts of charge and discharge are significantly smaller than those in the cell pack having no difference in voltage among the cells.

As one of the measures against the above-mentioned problem, the cells having the same or close voltages are combined to avoid the difference in voltage to assemble the cell pack. However, repeated charging and discharging sometimes cause a difference in voltage between or among the cells. This is because a degree of deterioration differs from cell to cell.

Such a circumstance develops a need for a cell balance circuit that reduces the difference in voltage between or among the cells, if any. The cell balance circuit measures the difference in voltage between the cells and adjusts the amount of charge or discharge by the amount corresponding to the difference in voltage. In this event, a circuit used for measuring the difference in voltage should have a high accuracy of measurement. To achieve this requires a significant amount of cost. The cell balance circuit requiring such a high cost, however, is not practical relative to a possibility of occurrence of such a difference in voltage. In addition, a circuit that adjusts the amount of charge is more complicated than a circuit that adjusts the amount of discharge because the former affects the charging route and the charging circuit.

SUMMARY OF THE INVENTION:

Therefore, an object of the present invention is to provide a cell balance circuit that achieves a balance of voltages among rechargeable cells to avoid a large difference in voltage among the cells when they are connected in series.

Another object of the present invention is to provide a cost-effective cell balance circuit.

It is yet another object of the present invention to provide a cell balance circuit that does not requires a complicated circuit.

A cell balance circuit according to the present invention comprises a cell group in which two or more rechargeable cells are connected in series and which keeps a balance of voltage of these cells such that the voltage does not become significantly different from cell to cell.

According to an aspect of the present invention, the cell balance circuit comprises a voltage converting circuit that converts the voltages of the respective cells in the cell group into GND (ground) voltage standards on the basis of a ground voltage to produce two or more converted voltages. An output circuit determines a lowest voltage of the two or more converted voltages and produces the lowest voltage. Discharge circuits are provided for the respective cells for forming discharge loops to discharge the corresponding cells. Discharge control circuits are provided for the respective discharge circuits. Each discharge control circuit determines a difference between the converted voltage of the corresponding cell and the lowest voltage to control the discharge circuit to form the discharge loop when the difference exceeds a predetermined value.

Figure 1:
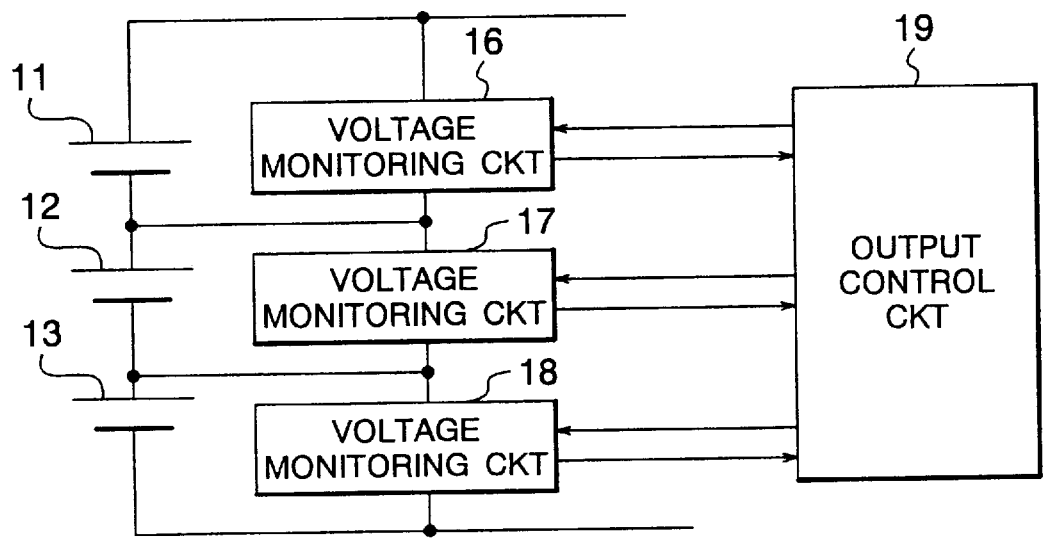
FIG. 1 is a circuit diagram illustrating an example of a conventional protective circuit.

DESCRIPTION OF THE PREFERRED EMBODIMENTS:

Referring to FIG. 1, a conventional protective circuit is described for the purpose of facilitating the understanding of the present invention. In FIG. 1, the protective circuit comprises voltage monitoring circuits 16, 17, and 18. The voltage monitoring circuits are provided for cells 11, 12, and 13, respectively, that are connected in series to each other. The voltage monitoring circuits 16, 17, and 18 each comprises an over-charge detecting circuit (not shown). Each voltage monitoring circuit uses outputs from the over-charge detecting circuit contained therein to form a discharge route for the cell of which over-charge is detected. The voltage monitoring circuit then forces that cell to discharge the electrical current to decrease the voltage of such cell, thereby decreasing a difference in voltage from other cells.

However, the protective circuit of this type does not effectively balance the difference in voltage among the cells because the voltage monitoring circuits operate independently of the voltage of other cells. The protective circuit can strike a balance of the cells when there is a large difference in voltage among the cells. However, it operates even when the difference is not so large. Accordingly, this circuit is not an effective one.

The over-charge detecting circuit has a hysteresis to stabilize the operation. This means that the discharge routes are established for all cells when the difference in voltage among the cells is small. More specifically, the over-charge detecting circuit supplies an over-charge detection signal to an output control circuit 19 when it detects an over-charge of the cell. In response to this, the output control circuit 19 produces a signal that makes all voltage monitoring circuits 16 through 18 have a hysteresis. A detected value for the voltage monitoring circuit where no over-charge is detected is converted into an over-charge releasing voltage value. The over-charge releasing voltage value is obtained by means of subtracting a value of a hysteresis voltage from a value of an over-charge detecting voltage. When the value of the hysteresis voltage is large and the value of the difference in voltage among the cells is small, the voltage across the cells is below the over-charge releasing voltage in all voltage monitoring circuits 16 through 18. This results in formation of the discharge routes.

Figure 2:
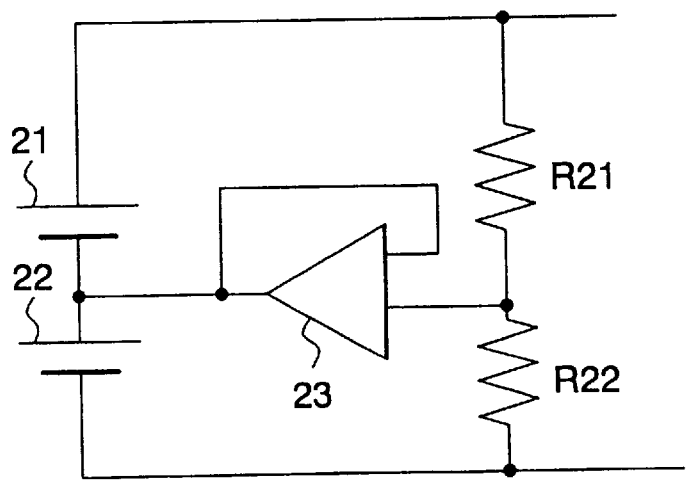
FIG. 2 is a circuit diagram illustrating an example of a conventional circuit for adjusting a discharge current.

Referring to FIG. 2, a circuit for adjusting the discharge current is described that is used to solve the above-mentioned problem. In FIG. 2, an adjusting circuit comprises a combined circuit of a voltage dividing circuit formed of resistors R21 and R22 and an operational amplifier 23. The adjusting circuit adjusts the amount of a discharge current by using the difference in voltage between cells 21 and 22. In this adjusting circuit, a measurement error is caused due to a relative accuracy of a resistance ratio of the resistors R21 and R22 as well as an offset of the operational amplifier 23. The relative accuracy of the resistance ratio and the accuracy of measurement of the difference in voltage can be improved only at a high cost and with a large-scale circuit structure.

Figure 3:
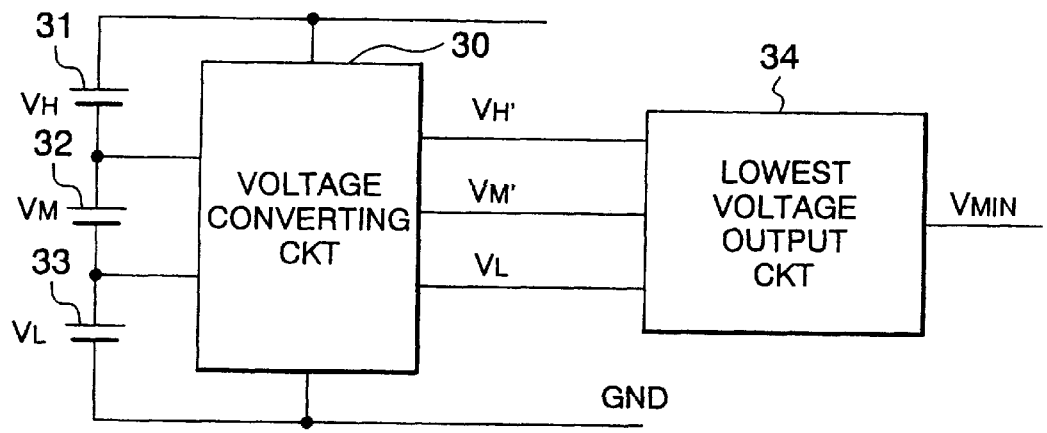
FIG. 3 is a diagram illustrating a part of a cell balance circuit according to the present invention.
Figure 4:
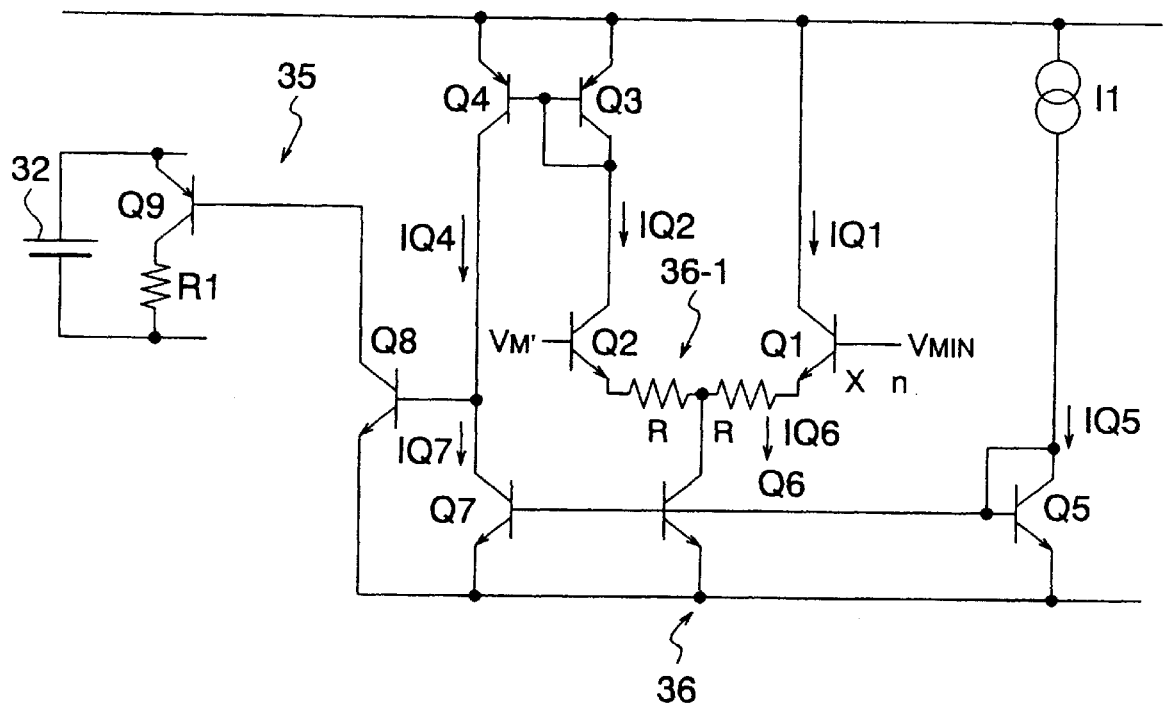
FIG. 4 is a diagram illustrating a circuit that forms a cell balance circuit of the present invention in cooperation with the circuit illustrated in FIG. 3.

Referring to FIGS. 3 and 4, a cell balance circuit according to a preferred embodiment of the present invention is described. In this embodiment, a part of a cell balance circuit is illustrated in which three lithium ion cells (hereinafter, referred to as cells) are connected in series to each other. The cell balance circuit is used as, for example, a power supply for personal computers and word processors. In FIG. 3, it is assumed that a cell pack comprises cells 31, 32, and 33 which are connected in series and which have voltages VH, VM, and VL, respectively. The cell balance circuit comprises a voltage converting circuit 30. The voltage converting circuit 30 converts the voltages VH, VM, and VL of cells 31, 32, and 33, respectively, into GND (ground) voltage standards on the basis of a ground voltage and produces converted voltages VH', VM', and VL. It should be noted here that the voltage VL is produced from the voltage converting circuit 30 as it is. This is because the cell 33 is directly connected to a ground line GND having the ground voltage. A lowest voltage output circuit 34 receives the converted voltages VH; VM', and VL and determines a lowest voltage having a minimum voltage value. The lowest voltage output circuit 34 produces the lowest voltage depicted at VMIN. The voltage converting circuit 30 can be realized from a buffer amplifier and a subtraction amplifier. The cell balance circuit achieves protection against the-over-charge by comparing the converted voltages VH', VM', and VL with the lowest voltage VMIN.

The lowest voltage output circuit 34 is used to provide information on the voltages of the cells to a personal computer that has the present cell balance circuit therein. In response to the lowest voltage VMIN, the personal computer estimates a capacity of the cell and displays the capacity. The personal computer also uses the lowest voltage VMIN to determine whether it should shift to a memory backup mode. More specifically, the personal computer carries out the memory backup mode to protect a memory or memories contained therein before stopping the discharge when the voltage of the cell drops to a level at which the protection operation against the over-charge is performed.

The cell balance circuit according to the present invention comprises a combination of the circuits illustrated in FIGS. 3 and 4. The cell balance circuit forms a discharge loop for the cell when a difference (VH'–VMIN), (VM'–VMIN), or (VL–VMIN) exceeds a predetermined value between the lowest voltage VMIN and the converted voltage VH', VM', or VL, of the cell that is converted into the GND voltage standard.

In FIG. 4, the cell balance circuit comprises discharge circuits and discharge control circuits. The discharge circuit is provided for each cell and forms a discharge loop to force the corresponding cell to discharge. The discharge control circuit is provided for each discharge circuit to determine a difference between the converted voltage of the corresponding cell and the lowest voltage. The discharge control circuit controls the discharge circuit to form the discharge loop when the difference exceeds the predetermined value. In this embodiment, description is made in conjunction with a discharge circuit 35 connected to the cell 32 and a discharge control circuit 36 in FIG. 4. However, it is understood that similar discharge circuits and discharge control circuits are connected to other cells 31 and 33.

The discharge circuit 35 comprises a transistor (first transistor) Q9 and a resistor R1. The discharge control circuit comprises a comparison circuit 36-1, a transistor (second transistor) Q6, and a drive circuit. The comparison circuit 36-1 comprises transistors Q1 and Q2 and two resistors R connected to emitters of the transistors Q1 and Q2, respectively. The drive circuit comprises a current mirror circuit and transistors Q7 and Q8. A transistor Q6 is connected to junctions of the resistors R and is turned on and off in response to a comparison result obtained by the comparison circuit 36-1. The current mirror circuit is formed of transistors Q3 and Q4 that are connected to the transistors Q7 and Q8. The drive circuit drives the discharge circuit 35 in response to the on- or off-state of the transistor Q6.

A base terminal of the transistor Q1 is supplied with the lowest voltage VMIN from the lowest voltage output circuit 34 in FIG. 3. On the other hand, a base terminal of the transistor Q2 is supplied with the converted voltage VM' of the corresponding cell 32. The transistors Q2, Q6, Q7, and Q8 are turned on and the transistor Q9 is turned on when the difference (VM'–VMIN) exceeds the predetermined value between the lowest voltage VMIN and the converted voltage VM' that is converted into the GND voltage standard. Thus, a discharge loop is formed for the discharge circuit 35 to discharge the cell 32. As a result, the voltage VM of the cell 32 drops until the difference voltage in the comparison circuit 36-1 decreases below the above-mentioned predetermined value. Accordingly, no difference in voltage among the cells is now present. The above-mentioned predetermined value may be set optionally by means of changing the value of the resistors R or an area ratio of the emitters of the transistors Q1 and Q2.

While the above description has been made in conjunction with the lithium ion cells, the present invention can be applied to any kind of rechargeable cells and is not limited to the lithium cells.

The cell balance circuit according to the present invention has a simplified circuit structure by means of forming the discharge loop for the cell when the difference (VH'–VMIN), (VM'–VMIN), or (VL–VMIN) exceeds the predetermined value between the lowest voltage VMIN and the converted voltage VH', VM', or VL, of the cell that is converted into the GND voltage standard. In particular, a possible cause of error in measuring the difference in voltage, such as an offset voltage, can be ignored because the operational point of the circuit is set at a point when the difference becomes large. This allows down-sizing of the circuit.

What is claimed is:

1. A cell balance circuit for achieving a balance of voltages among two or more rechargeable cells connected in series in a cell group, said cell balance circuit comprising:
   a voltage converting circuit that converts the voltages of the respective cells in the cell group into GND voltage standards based on a ground voltage to produce two or more converted voltages;
   an output circuit that determines a lowest voltage of the two or more converted voltages to produce the lowest voltage;
   a plurality of discharge circuits, respectively provided for corresponding ones of the cells, said discharge circuits forming a discharge loop for discharging the respective cells; and
   a plurality of discharge control circuits, also respectively provided for corresponding ones of the cells, which detect a difference between the converted voltages of the respective cells and the lowest voltage, and which control said discharge circuits to form the discharge loop when the difference exceeds a predetermined values;
   wherein each of said discharge control circuits comprises:
   (i) a comparison circuit for use in detecting a difference between the converted voltage of a corresponding cell and the lowest voltage, said comparison circuit including a first transistor which has a base terminal supplied with the converted voltage of the corresponding cell and a second transistor which has a base terminal supplied with the lowest voltage; and (ii) a drive circuit connected between the comparison circuit and the discharge circuit of the corresponding cell, said drive circuit including a current mirror circuit and a third transistor which is turned on together with the current mirror circuit to drive the corresponding discharge circuit to form said discharge loop when the difference detected by the comparison circuit exceeds the Predetermined value.

2. A cell balance circuit as claimed in claim 1, wherein the cells comprise lithium ion cells.

3. A cell balance circuit as claimed in claim 1 or 2, wherein each of said discharge circuits comprises a resistor for use in discharging a corresponding cell and a fourth transistor for use in connecting the corresponding cell to said resistor.

4. A cell balance circuit for achieving a balance of voltages among at least three rechargeable cells connected in series in a cell group, said cell balance circuit comprising:
   a voltage converting circuit that converts the voltages of the respective cells in the cell group into GND voltage standards based on a ground voltage to produce at least three converted voltages;
   an output circuit that determines a lowest voltage of the at least three converted voltages to produce the lowest voltage;
   a plurality of discharge circuits, respectively provided for corresponding ones of the cells, said discharge circuits forming a discharge loop for discharging the respective cells; and
   a plurality of discharge control circuits, also respectively provided for corresponding ones of the cells, which detect a difference between the converted voltages of the respective cells and the lowest voltage, and which control said discharge circuits to form the discharge loop when the difference exceeds a predetermined value.

5. A cell balance circuit as claimed in claim 4, wherein the cells comprise lithium ion cells.

6. A cell balance circuit as claimed in claim 4 or 5, wherein each of said discharge circuits comprises a resistor for use in discharging a corresponding cell and a fourth transistor for use in connecting the corresponding cell to said resistor.

7. A cell balance circuit as claimed in claim 4, wherein each of said discharge control circuits comprises:
   a comparison circuit for use in detecting a difference between the converted voltage of a corresponding cell and the lowest voltage, said comparison circuit including a first transistor which has a base terminal supplied with the converted voltage of the corresponding cell and a second transistor which has a base terminal supplied with the lowest voltage; and
   a drive circuit connected between the comparison circuit and the discharge circuit of the corresponding cell, said drive circuit including a current mirror circuit and a third transistor which is turned on together with the current mirror circuit to drive the corresponding discharge circuit to form said discharge loop when the difference detected by the comparison circuit exceeds the predetermined value.

* * * * *